(Model.)
D. W. BOVEE.
HAY RAKE AND LOADER.
No. 250,339. Patented Dec. 6, 1881.
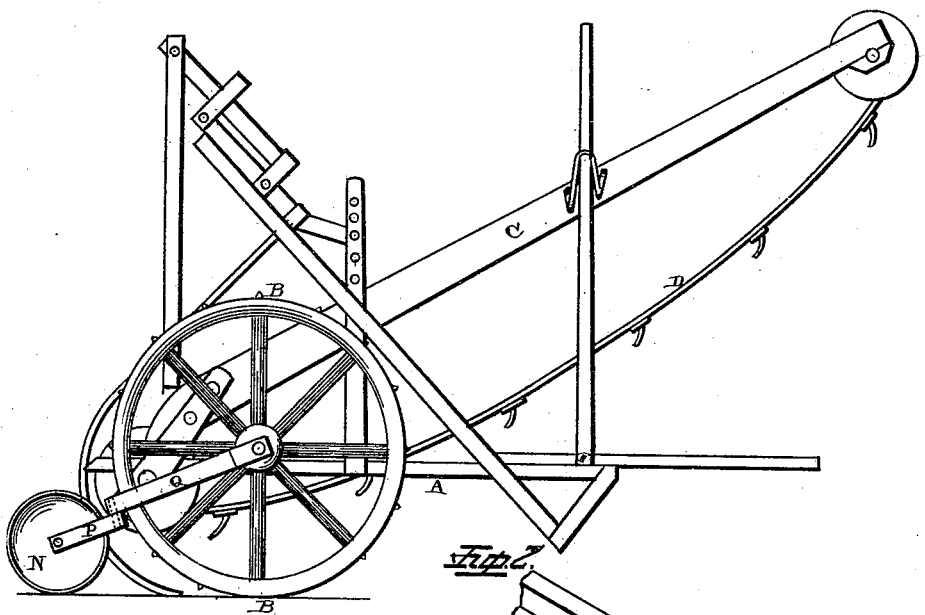
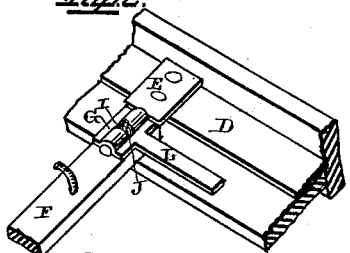
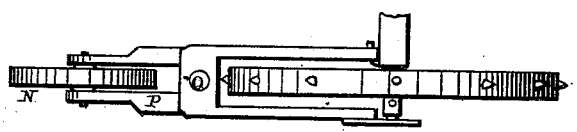
Witnesses.
W. W. Mortimer
A. C. Kiskadden
Inventor
D. W. Bovee,
per
F. A. Lehmann,
Atty.

UNITED STATES PATENT OFFICE.

DAVID W. BOVEE, OF RICHLAND CENTRE, WISCONSIN.

HAY RAKE AND LOADER.

SPECIFICATION forming part of Letters Patent No. 250,339, dated December 6, 1881.

Application filed May 6, 1881. (Model.)

*To all whom it may concern:*

Be it known that I, DAVID W. BOVEE, of Richland Centre, in the county of Richland and State of Wisconsin, have invented certain new and useful Improvements in Hay Rakes and Loaders; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes and loaders; and it consists in a follower-wheel which is attached to the machine and runs immediately in the rear of one of the driving-wheels, so as to run upon the hay and by its weight pull the hay loose which would have a tendency to drag on behind the teeth and fall over upon the space which has already been raked.

It still further consists in forming the braces which hold the slats in position while passing up over the elevator as a part of the boxing, all of which will be more fully described hereinafter.

Figure 1 is a side elevation of my invention. Fig. 2 is a perspective of a portion of one of the slats and its attachment to the belt. Fig. 3 is a detached plan view of the follower-wheel.

A represents a suitable frame-work, which is supported upon the driving-wheels B, and C the elevating-frame. These parts, together with the levers attached to the rake-teeth, are shown in my former patents, and hence need not be more fully described here.

To the belts or chains D are secured the journals E, one for each end of each of the elevating-slats F. This journal consists in a suitable casting, which is riveted or fastened to the belt in any suitable manner, or which may form a portion of one of the links, where a chain is used, and which journal has its inner end rounded so as to fit in the boxing G, prepared to receive it upon the top of the end of the slat. Through this boxing, which may be of any suitable construction, is made a slot, I, and extending outward from the journal through this slot is a projection, J, which serves as a stop to regulate the distance that a slide shall turn. Formed with the box in a single piece is a brace, L, which rests upon a bottom piece provided for it in the elevator-frame, and which brace serves to keep the slats in their proper position while passing up over the elevator. When these slats reach the top of the elevator-frame the brace passes beyond the support in the end of the frame, and then the slats can turn backward, so that their teeth will not pull any of the hay that is being elevated down with them over the top of the elevating-frame.

By forming separate and independent journals and attaching them to the belts or chains and securing the boxing directly to the ends of the slats, the parts are much more easily constructed, are much more readily secured in position, and cost much less.

In using a machine of this kind the hay is apt to catch upon the teeth which are next to the unraked part of the field, and not only drag along but serve to pull the hay over upon that 70 part of the field which has just been raked. Where the hay gets fastened to one or more of the teeth it constantly accumulates until the weight of the hay which is being dragged along to pull the teeth backward so that the teeth of the elevator-rake cannot catch hold of the hay that has been raked by these teeth; and hence the operation of the machine is not only incomplete but the draft is made much heavier upon the animals drawing the machine. To obviate this trouble I fasten a follower-wheel, N, by means of suitable connecting parts, P Q, to one end of the axle, so that it will run immediately behind the driving-wheel, which is next to the unraked portion of the field. These two parts P Q are pivoted together so that the wheel can freely turn, and thus follow the machine when being turned around, and are pivoted at their front ends to the axle so that the wheel can freely rise and fall with all inequalities of the ground. This wheel runs directly behind the driving-wheel and by its weight serves to pull loose from the teeth all the hay which may catch upon the teeth and not only drag behind but be drawn over and drop upon that part of the ground which has just been raked. This follower-wheel is a great improvement to the machine, for it prevents the hay from catching on the teeth and pulling them back in such a manner that the hay which is gathered by them cannot be reached by the teeth of the elevating-slats.

In the patent granted to me August 24, 1880, No. 231,391, the bearings for the slats are shown as attached to the belts instead of to the slats, as here shown. The difference between the two consists in the use of a journal which is independent of the slat, and which is secured to the elevating-belt, thus enabling the box G and brace L to be made in a single piece. This construction, as above described, enables the parts to be more easily secured together, and reduces the cost of the machine.

Having thus described my invention, I claim—

1. The combination of a hay-rake with a follower-wheel which runs behind the machine and serves to pull loose the hay which is hanging onto the teeth, substantially as shown.

2. The combination of a hay-rake with a follower-wheel that is connected thereto by means of the two parts P Q, whereby the wheel has a universal motion, substantially as described.

3. In a hay rake and loader, the combination of the slat F and the box G, secured thereto and having the brace L formed with it, with the journal E, secured to the belt D, substantially as specified.

In testimony that I claim the foregoing I have hereunto set my hand this 30th day of March, 1881.

DAVID WM. BOVEE.

Witnesses:
 WM. H. PALMER,
 ELISHA BOVEE.